United States Patent [19]
Couston et al.

[11] 4,102,210
[45] Jul. 25, 1978

[54] PRESSURE TRANSDUCERS

[75] Inventors: Frederick Robert Couston; Roy Robert Bannock, both of Basingstoke, England

[73] Assignee: Bell & Howell Limited, Basingstoke, England

[21] Appl. No.: 666,627

[22] Filed: Mar. 15, 1976

[30] Foreign Application Priority Data

Mar. 18, 1975 [GB] United Kingdom .............. 11297/75

[51] Int. Cl.² .............................................. G01L 9/06
[52] U.S. Cl. .......................................... 73/727; 338/4; 338/42
[58] Field of Search ................... 73/398 AR, 406, 721, 73/727; 338/4, 6, 325, 42

[56] References Cited
U.S. PATENT DOCUMENTS

| 2,398,372 | 4/1946 | Green | 73/398 AR |
| 2,942,219 | 6/1960 | McGrath | 73/398 AR |
| 3,335,381 | 8/1967 | Giovanni | 338/4 |
| 3,537,318 | 11/1970 | Helin | 73/398 AR |

Primary Examiner—Donald O. Woodiel
Attorney, Agent, or Firm—David Weiss

[57] ABSTRACT

A transducer responsive to pressure or force, comprises a diaphragm secured around its periphery to the housing of the transducer and having a cup-shaped portion formed concentrically therein. Means are provided for applying, in use, a pressure or force to one surface of the diaphragm and means responsive to the resulting deflection of said diaphragm for providing an indication of the applied pressure or force. Strain gauges are mounted on an annular portion of the diaphragm which extends between the cup-shaped portion and the periphery of the diaphragm. An overload protection device may be provided to limit deflection of the diaphragm.

14 Claims, 5 Drawing Figures

PRESSURE TRANSDUCERS

BACKGROUND OF THE INVENTION

This invention relates to transducers responsive to pressure or force and concerns transducers including a flexible diaphragm rigidly secured around its periphery, to which diaphragm a pressure or force can be applied.

DISCUSSION OF THE PRIOR ART

Means for determining the applied pressure or force are required and one way is to provide strain gauges which are bonded, for example by deposition by a thin film technique, to a surface of the diaphragm and are connected as the arms of a Wheatstone Bridge Circuit. Such transducers are known as "strain gauge transducers".

When pressure or force is applied to the diaphragm of a strain gauge transducer, the diaphragm is deflected and a stress/strain condition is set up in the diaphragm. The strain resulting from the deflection is measured by the strain gauges, which thus provide an output dependent upon the pressure or force to which the diaphragm has been subjected. In normal practice, two of the four strain gauges forming the Wheatstone Bridge are positioned in an area of tension strain, and the other two are positioned in an area of compression strain, thus forming a "four active arm bridge". In a conventional flat diaphragm, the tension strain area is in the center of the diaphragm, and the compression strain area is at the periphery of the diaphragm.

In order to prevent permanent damage to both the diaphragm and the strain gauges, for example, when it is subjected to excess or overload pressures, the deflection of the diaphragm should be limited.

Existing overload or overpressure protection devices sometimes utilize various forms of mechanical stops which prevent deflection of the diaphragm beyond a predetermined limit. Such a mechanical stop may take the form of a screw which is mounted in the housing of the transducer and has an abutment surface so spaced from the diaphragm by the predetermined amount that when the transducer is subjected to an overload pressure the diaphragm is deflected until it abuts the abutment surface which prevents further deflection. Such an arrangement may be readily adjusted in order to vary the deflection limit of the diaphragm.

However, existing arrangements including such protection devices have inherent disadvantages. In the case of a flat diaphragm, the point of maximum deflection is the center, and hence the overpressure stop is located at this point. This gives rise to two problems. Firstly, the point of maximum stress in the diaphragm is at the periphery, and an overpressure stop located at the center does not completely limit the stresses developed at the periphery when overpressure is applied and after the deflection of the center has been limited by the overpressure stop. Secondly, it has already been mentioned that in the case of a transducer embodying a flat diaphragm, the tension strain gauges should be positioned at or close to the center of the diaphragm. Thus, in order to avoid contact with, and damage to, the tension gauges, the area of the part of the stop arranged to contact the diaphragm when overpressure is applied must be small in relation to the diameter of the diaphragm. Thus, when the diaphragm is deflected as the result of a steadily increasing pressure, the center will eventually come up against the overpressure stop. However since the diaphragm is by design extremely flexible, the increasing pressure and consequent further deflection will cause deformation of the diaphragm in the annular portion of the diaphragm between the periphery and the overpressure stop with a high stress point around the peripheral edge of the overpressure stop. Both of these effects, if large, may cause permanent damage to the diaphragm. In addition, this arrangement may significantly increase the length of the transducer, which could be a problem in certain applications.

A transducer disclosed in U.S. Pat. No. 3,341,794 issued to Stedman on Sept. 12, 1967, includes a circular diaphragm fitted with a relatively rigid, centrally disposed cylindrical boss and a flexible annular portion of the diaphragm around the boss. The strain sensitive gauges are mounted in the area of this flexible annular portion, with tension gauges at the inner edge, and compression gauges at the outer edge. The mechanical stop, which may take the form of a screw as aforesaid, has its abutment surface positioned such that the rigid, centrally disposed cylindrical boss abuts the abutment surface at overload pressure conditions. The boss adds substantially to the mass of the diaphragm and this can have deleterious effects on the measurements if the transducer is subjected, in use, to acceleration or vibration.

SUMMARY OF THE INVENTION

According to the invention there is provided a transducer responsive to pressure or force, comprising a diaphragm rigidly secured around the periphery of an active portion thereof, and having a cup-shaped portion formed concentrically therein, means for applying, in use, a pressure or force to one surface of the diaphragm and means responsive to the resulting deflection of said diaphragm for providing an indication of the applied pressure or force.

Preferably both the periphery of the active portion and the cup-shaped portion are circular and define an annular portion of the diaphragm between the said periphery and cup-shaped portion.

Preferably the ratio of the superficial area of the cup-shaped portion to that of the active portion is as large as is practicable.

Preferably the cup-shaped portion is part of the said one surface and is open to the other surface of the diaphragm.

A transducer according to the preceding paragraph may further comprise an overload protection member which has an abutment surface spaced from the internal base surface of the cup-shaped portion by a predetermined amount to limit deflection of the diaphragm towards the overload protection member to the said amount. The overload protection device may be so arranged that the spacing between the abutment surface and the internal base surface of the cup-shaped portion is adjustable. Thus a transducer according to the invention may be provided with a simple and compact overpressure stop.

DESCRIPTION OF THE DRAWINGS

This invention will now be described by way of example with reference to the accompanying drawings, in which.

DETAILED DESCRIPTION OF THE INVENTION

Figure 1A:
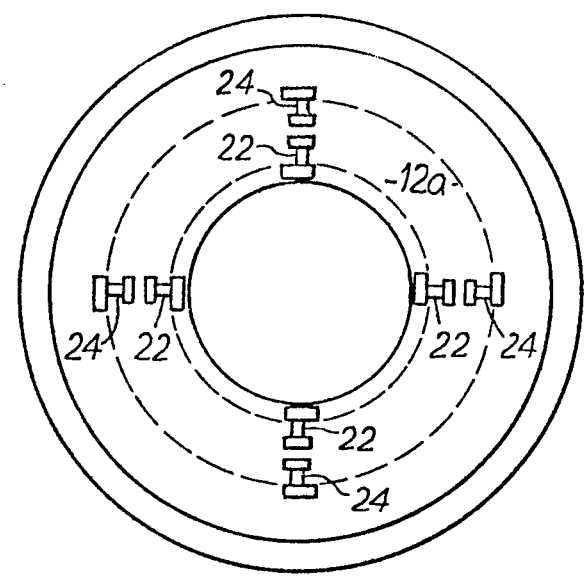
FIGS. 1a and b show respectively a plan view and a cross-sectional view of a diaphragm rigidly secured to part of a housing of an embodiment of a transducer according to the invention.

Referring to the drawings there is shown a pressure transducer 10 comprising a diaphragm 12 rigidly secured around its periphery to a wall 14a which forms part of the housing 14 of the transducer. The diaphragm 12 has a shallow, cup-shaped portion 16 in the form of a right circular cylinder formed concentrically therein which portion is surrounded by an annular portion 12a. The diaphragm 12 can be rigidly secured to the wall 14a as by welding, or the diaphragm and wall can be machined from one piece. In a diaphragm having a configuration as shown the annular portion 12a is more flexible than the cup-shaped portion.

The diaphragm 12 forms a dividing wall between two chambers 18a, 18b in the housing 14, with the cup-shaped portion 16 extending into chamber 18a. A fluid whose pressure is to be determined can be admitted to the chamber 18a by way of a port 20 so that differential pressure in the chambers 18a and 18b will cause deflection of the diaphragm 12. The chamber 18b can be at atmospheric pressure or can be at any other predetermined pressure but it is arranged that, in use, the pressure in chamber 18a is equal to or greater than the pressure in chamber 18b so that one surface of the diaphragm (the lower surface in FIG. 2) is subjected to a pressure equal to or greater than that applied to the other surface and the diaphragm 12 is deflected unidirectionally, that is, upwardly in FIG. 2.

Figure 2:
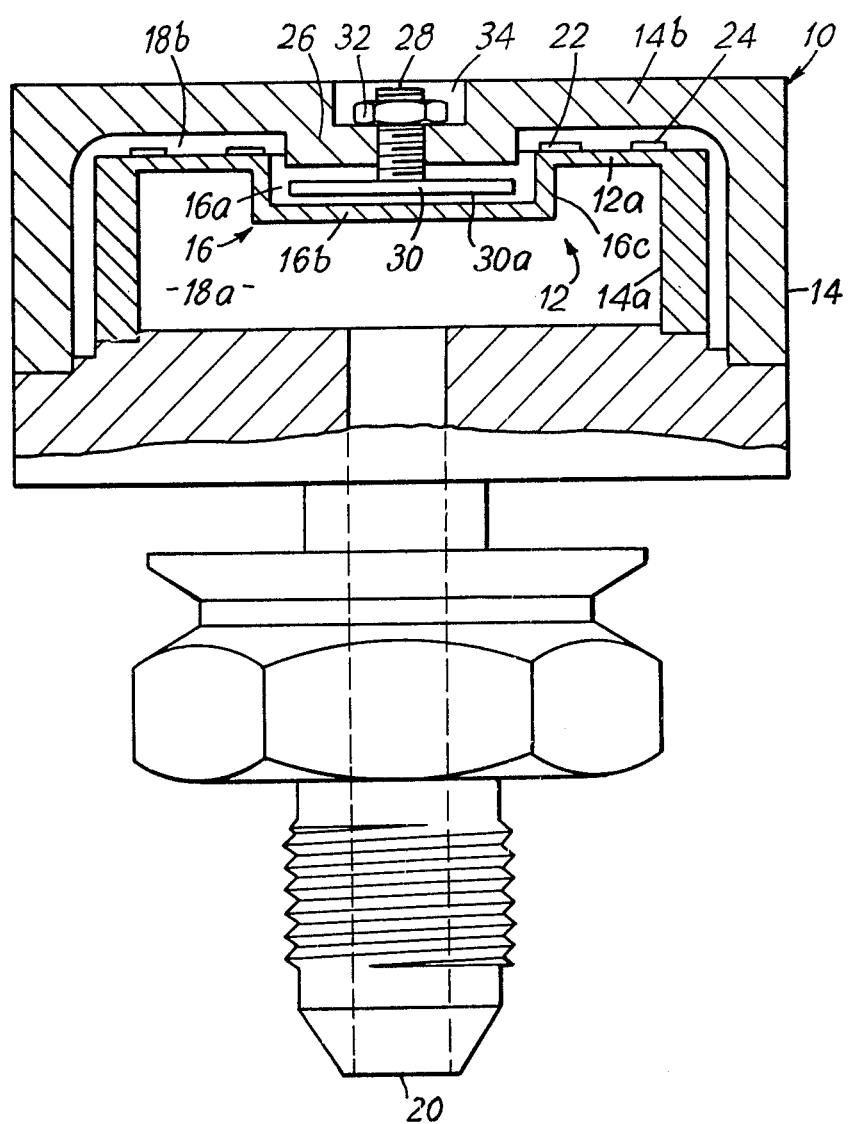
FIG. 2 shows a side view, partly in section, of a transducer according to the invention embodying a diaphragm shown to a different scale in FIG. 1.

In a preferred embodiment, the cup-shaped portion 16 of the diaphragm 12, forms a cavity 16a which opens toward the cavity 18b, upwardly in FIG. 2. The cup-shaped portion 16 can be formed with bottom wall 16b and a right cylindrical side wall 16c extending concentrically downwardly from the inner circumference of the annular portion 12a to the outer circumference of of the bottom wall 16b. The bottom wall 16b of the cup-shaped portion 16 lies in a plane which is substantially parallel to that of the annular portion 12a when there is no pressure differential between the cavity 18a and 18b. This bottom wall 16b covers the bottom of side wall 16c to complete the diaphragm 12. In a particular embodiment, the bottom wall 16b may not be the furthest extremity of the diaphragm 12 in the direction of the inlet port 20.

Figure 1B:
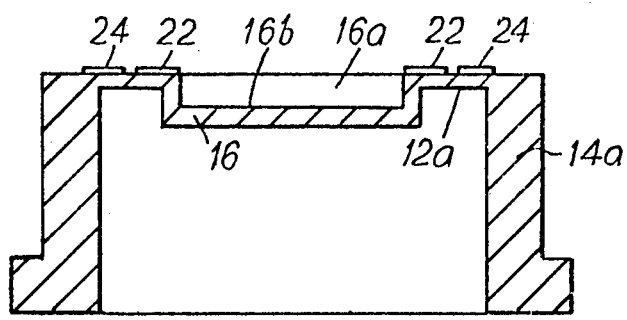

Means responsive to deflection of the diaphragm are provided in the form of strain gauges 22, 24 which may be deposited by thin film techniques on the said other surface (upper surface as viewed in FIG. 1b) of the diaphragm as shown. The gauges 22 are primarily responsive to tension strain and the gauges 24 to compression strains. In operation, the gauges are connected in known manner to form the arms of a Wheatstone Bridge Circuit.

A further wall 14b of the housing 14 in spaced, parallel relation to diaphragm 12 includes a protruding portion 26, concentric with the cup-shaped portion 16. The diameter of the protruding portion or protrusion 26 is made slightly smaller than the internal diameter of the cup-shaped portion 16 as it is directed towards and may extend into the cavity 16a a short way as shown. The protrusion 26 is provided with an axial, threaded aperture into which a screw-threaded member 28 is threaded. The member 28 is provided at one end with a disc-like head 30 arranged in a plane parallel to and spaced a predetermined distance from the bottom wall 16b of the cup-shaped portion 16. The surface 30a of the head 30 facing the wall 16b of the cavity 16a acts as an abutment surface for the base of the cup-shaped portion and thus limits deflection of the diaphragm to the predetermined amount. The member 28 is threaded so that the distance between the disc 30 and the wall 16b of the cavity 16a can be adjusted depending upon the maximum allowable deflection of the diaphragm. A locking ring 32, which may be positioned within a wall cavity 34 screw-threadedly engages the member 28 to lock the member 28 in position after adjustment. The combination of members 28, 30, 32 thus constitutes an overpressure stop for the transducer. By locating the member 28 and locking ring 32 entirely within the cavity 34 formed by the protruding wall portion 26 as shown, it is thus possible to provide a transducer with a simple and compact overpressure stop which adds little or nothing to the overall dimensions of the transducer. If an adjustable overpressure stop is not required a simpler arrangement can, of course, be provided. For example, the protrusion 26 could be so dimensioned as to form the overpressure stop. Alternatively, an overpressure stop can be omitted altogether.

Figure 3:
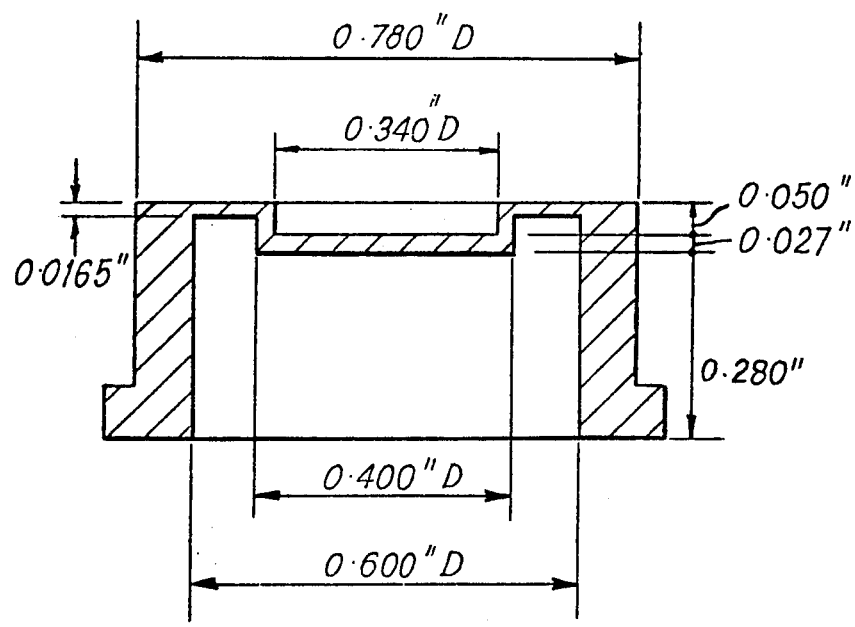
FIG. 3 is a view similar to that of FIG. 1b showing typical dimensions for the diaphragm.
Figure 4:
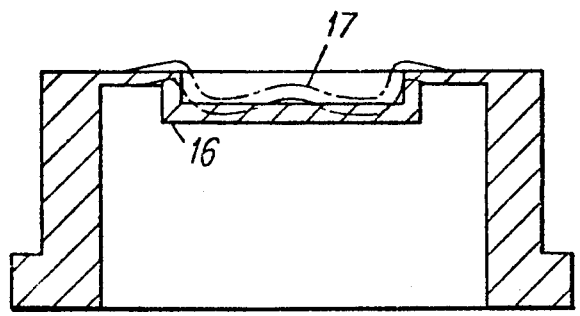
FIG. 4 shows a cross-sectional view of a diaphragm according to the invention, and in phantom, the profile of the diaphragm when stressed.

As aforementioned, the cup-shaped portion 16 of the diaphragm is stiffer than the annular portion 12a even if the cup-shaped portion 16 is provided with a relatively thin walled construction. FIG. 4 shows a cross-sectional view of the diaphragm of FIG. 1 in full lines and the broken lines 17 show, somewhat exaggerated, the profile of such a diaphragm when it is stressed. A typical set of dimensions in inches for a diaphragm designed to operate at a normal pressure range of 500 p.s.i. is shown in FIG. 3. Thus it will be seen that increased stiffness at the center relative to the annular portion is achieved with very little increase in the mass of the diaphragm.

The deflection of the diaphragm under applied pressure, and the consequent stress and strain levels in the relatively flexible annular area, results from two factors, namely the pressure acting on the central area, and the pressure acting on the annular area. Before the overpressure stop limits deflection of the diaphragm, the rate of increase in stress and strain with increase in pressure is dependent upon these two factors. However, when the overpressure stop limits further deflection, that is after the applied pressure has caused the diaphragm 12 to be deflected until it abuts the surface 30a of the overpressure stop, the rate of increase in stress and strain with increase in applied pressure is dependent upon the second factor only. As the central area is not rigid, as shown in FIG. 4, there will be an intermediate condition commencing when the diaphragm first contacts the abutment surface during which the effect due to the first factor rapidly decreases and that due to the second factor rapidly increases. Thus if the diaphragm is designed and constructed such that the effect resulting from the first factor is considerably greater than the effect resulting from the second factor, (that is the superficial area of the cup-shaped portion is large compared to the more flexible annular area), then the diaphragm may be subjected to many times range overpressure without permanently damaging either the diaphragm or the strain gauges.

Preferably the ratio of the superficial area of the cup-shaped portions 16 to the superficial area of the annular portions 12a is as large as practicable and at least 1:2. In the embodiment illustrated in FIG. 3, this ratio is approximately 3:4. This greatly increases the degree of overpressure to which the transducer can be subjected. As an example, a transducer as dimensioned in FIG. 3, with the overpressure stop set to operate at 1.5 × range pressure, was subjected to up to 5 × range pressure without permanent damage to the transducer.

A suitable material for the diaphragm 12 and wall 14a is stainless steel 17-4PH as supplied by ARMCO Steel Corporation of Middletown, Ohio, U.S.A. Stainless steel 17-4PH comprises:

| | |
|---|---|
| Chromium | 15.5 – 17.5% |
| Nickel | 3 – 5% |
| Copper | 3 – 5% |
| Silicon | 1% max. |
| Manganese | 1% max. |
| Columbium and/or Tantalum | 0.25 – 0.45% |
| Iron | remainder |

The external housing of the transducer 10 can be a stainless steel such as the type 18-8 stainless steel supplied by Firth Brown Limited.

Some advantages of a transducer according to the invention comprising a diaphragm as described above are:

1. Adverse effects due to steady acceleration and vibration are considerably less than in the case of a transducer embodying a diaphragm with a rigid central boss. For example, in the case of a 500 p.s.i. range transducer having a diaphragm with the dimensions shown in FIG. 3, the unit output resulting from linear acceleration along the main axis has been measured as being only 0.006% of normal full range output per g acceleration.

2. It enables the use of a positive, compact, and efficient overload protection device in which the overall increase in length of the transducer resulting from the fitting of such a protection device is less than the increase resulting from existing forms of overpressure protection arrangements.

While an embodiment of a transducer according to the invention has been described in which the cup-shaped portion 16 is a right circular cylinder, it could take other forms such as bell-shaped or frusto conical.

What is claimed is:

1. A transducer responsive to pressure, comprising a diaphragm having first and second opposed surfaces and a cup-shaped portion formed concentrically in said diaphragm, said cup-shaped portion having external and internal surfaces forming part of said first and second surfaces respectively of said diaphragm, means for rigidly securing said diaphragm around its periphery to define an annular portion thereof between said periphery and said cup-shaped portion, means for applying a pressure to the first said surface of the diaphragm to produce in the annular portion an area of tension stress and an area of compression stress and means disposed on said annular portion in the area of tension stress and in the area of compression stress and being responsive to the resulting axial deflection of said diaphragm for providing an indication of the applied pressure.

2. A transducer according to claim 1, in which the annular portion has an inner circumference and a periphery, and the cup-shaped portion includes a bottom wall having an outer circumference and a side wall extending concentrically between the inner circumference of the annular portion and the outer circumference of the bottom wall.

3. A transducer according to claim 2 in which the ratio of the superficial area of the cup-shaped portion to the superficial area of the annular portion is as large as practicable.

4. A transducer according to claim 3, in which said ratio is at least as great as 1:2.

5. A transducer according to claim 4 in which said ratio is approximately 3:4.

6. A transducer according to claim 1 in which the diaphragm is disposed between a first cavity and a second cavity and the cup-shaped portion extends from the annular portion into the first cavity and opens toward the annular portion into the second cavity.

7. A transducer according to claim 6 for measuring the pressure of a fluid, wherein the first cavity is provided with an inlet port for the fluid.

8. A transducer according to claim 1, in which said means responsive to axial deflection of said diaphragm comprises strain gauge means.

9. A transducer according to claim 8 wherein the means for providing an indication of the applied pressure comprises a first strain gauge so positioned on said annular portion of said diaphragm that said first strain gauge is primarily responsive to tension strain and a second strain gauge so positioned on said annular portion of said diaphragm that said second strain gauge is primarily responsive to compression strain.

10. A transducer responsive to pressure, comprising a diaphragm having a first and second opposed surfaces and a cup-shaped portion formed concentrically in said diaphragm, said cup-shaped portion having external and internal surfaces forming part of said first and second surfaces respectively of said diaphragm and including a bottom wall having an outer circumference, means for rigidly securing said diaphragm around its periphery to define an annular portion thereof between said periphery and said cup-shaped portion said annular portion having an inner circumference and a periphery, means for applying a pressure to the first said surface of the diaphragm, means disposed on said annular portion responsive to the resulting axial deflection of said diaphragm for providing an indication of the applied pressure, and an overload protection member which extends into said cup-shaped portion and has an abutment surface spaced from the internal surface of said bottom wall of said cup-shaped portion by a predetermined amount to limit deflection of the diaphragm toward the overload protection member to the said amount.

11. A transducer according to claim 10, further comprising means for adjusting the spacing between the abutment surface and the internal base surface of the cup-shaped portion.

12. A transducer according to claim 10 in which said cup-shaped portion includes a cylinder disposed coaxially with said diaphragm.

13. A transducer for measuring the pressure of a fluid, comprising:

a housing having an end wall at one end thereof and an inlet port for the fluid at the other end thereof;

a diaphragm disposed internally of the housing and defining with a part of said housing including said inlet port a first cavity and defining with said end wall of the housing a second cavity, said diaphragm including:

an annular portion having a generally planar configuration in an inactive state and being defined by an outer periphery and an inner circumference, the outer periphery of the annular portion being connected to the housing;

a bottom wall of the diaphragm having an outer circumference and a generally planar configuration in the inactive state, the bottom wall being displaced from the plane of the annular portion in the direction of the first cavity;

a side wall of the diaphragm connecting the inner circumference of the annular portion with the outer circumference of the bottom wall and forming with the bottom wall a cup-shaped portion of the diaphragm having a particular cavity opening toward the end wall of the housing into the second cavity;

strain gauge means disposed on the annular portion of the diaphragm for providing an indication of the axial deflection of diaphragm when the fluid is introduced into the second cavity; and means protruding from the end wall of the housing into the second cavity and into the particular cavity of the cup-shaped portion of the diaphragm for inhibiting deflection of the bottom wall of the diaphragm beyond a predetermined distance.

14. The transducer recited in claim 13 wherein:

deflection of the diaphragm resulting from the introduction of the fluid into the second cavity produces in the annular portion of the diaphragm a first area in compression strain and a second area in tension strain; and the strain gauge means includes a plurality of strain gauges at least one of which is disposed on the first area of the annular portion of the diaphragm and the remainder of which are disposed on the second area of the annular portion of the diaphragm.

* * * * *